United States Patent

[11] 3,602,879

[72] Inventors William B. McLean
San Diego;
Lawrence W. Nichols, China Lake, both of, Calif.
[21] Appl. No. 826,540
[22] Filed May 21, 1969
[45] Patented Aug. 31, 1971
[73] Assignee The United States of America as represented by the Secretary of the Navy

[54] PHOTOGRAPHIC METHOD AND APPARATUS FOR PRODUCING POLYCHROMATIC ECHOGRAMS
1 Claim, 1 Drawing Fig.
[52] U.S. Cl. ................................................. 340/15.5 DS, 340/7, 350/172, 350/311
[51] Int. Cl. .................................................. G01v 1/00
[50] Field of Search ........................................ 340/15.5, 7; 350/172, 311

[56] References Cited
UNITED STATES PATENTS
2,991,446 7/1961 Loper ........................... 340/15.5
3,359,851 12/1967 Lipschutz et al. ............. 350/172
3,379,273 4/1968 Chelminski ................... 340/7

Primary Examiner—Richard A. Farley
Assistant Examiner—Joseph G. Baxter
Attorneys—Edgar J. Brower, Roy Miller and Gerald F. Baker ABSTRACT: The disclosure relates to a system for providing a three-color graphic representation of the subaqueous terrain. As in previous systems, a sound generator is used to transmit an acoustic signal to the ocean floor, which signal is then transmitted by reflection and appropriately received. Received signals are separated into pulses of a plurality of selected frequencies, which pulses are used to selectively activate a plurality of glow lamps in accordance with the detected frequencies. A dichroic mirror system is then used to convert the light from the glow lamps into primary color radiation which is then combined and used to make a photographic record of the signal pattern in color.

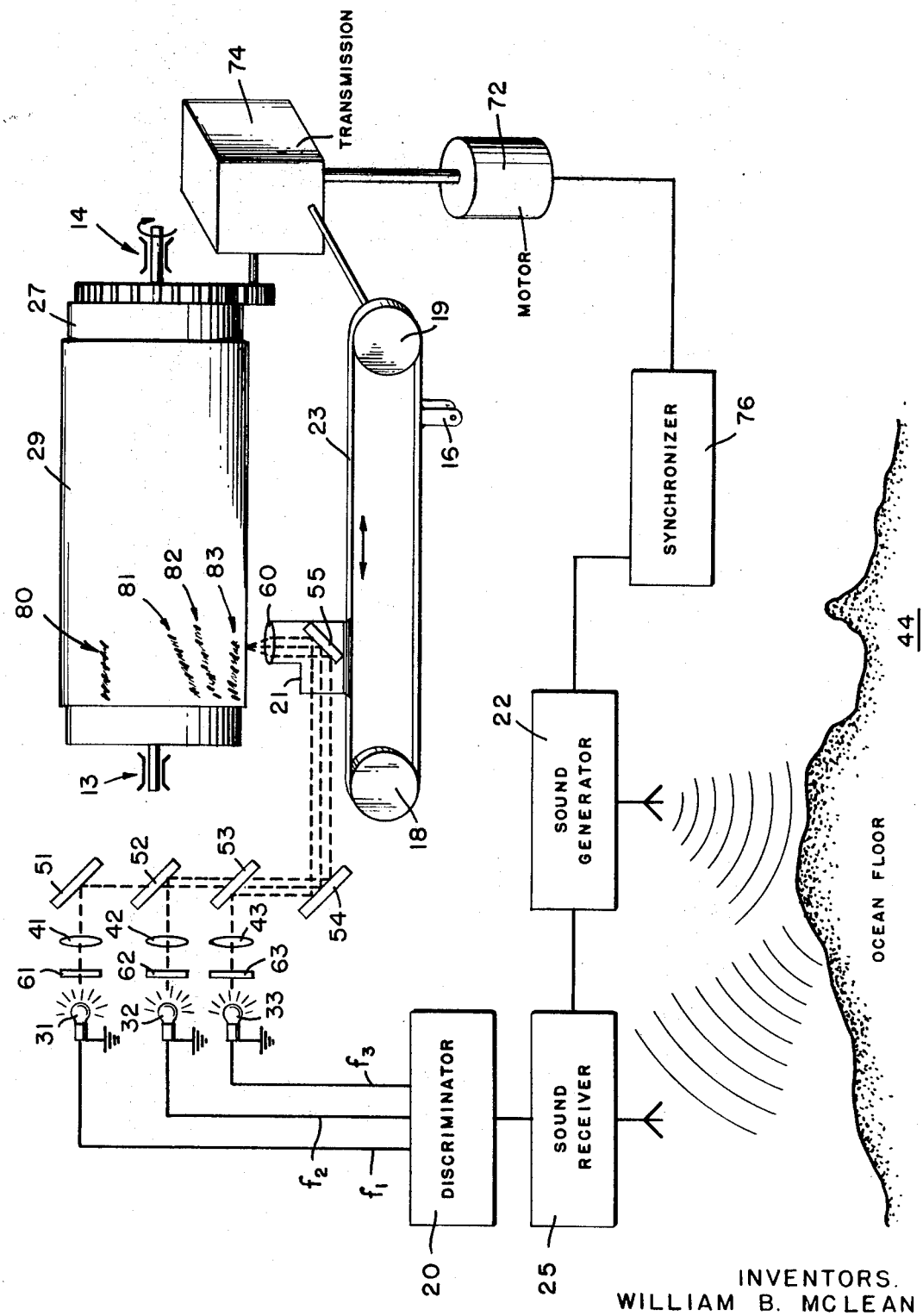

PHOTOGRAPHIC METHOD AND APPARATUS FOR PRODUCING POLYCHROMATIC ECHOGRAMS

GOVERNMENT INTEREST

The invention described herein may be manufactured and used by or for the Government of the United States of America for governmental purposes without the payment of any royalties thereon or therefor.

CROSS-REFERENCE TO RELATED APPLICATION

A similar application of the peculiar dichroic mirror arrangement herein disclosed may be found in assignees' copending application Ser. No. 655,722, filed 20 July 1967, for an Infrared Radiometer, now U.S. Pat. No. 3,508,051.

BACKGGOUND OF THE INVENTION

It has long been recognized that much more information can be displayed on a multicolored display than may be had from devices producing only black and white or shades of grey. U.S. Pat. No. 3,401,400 discloses an apparatus for displaying in color seismic data in accordance with the use of variable sensing means to provide a record upon color sensitive film. U.S. Pat. No. 3,295,142 discloses a seismographic method resulting in a color recording.

Reference is also made to U.S. Pat. No. 3,065,815 for a discussion of the types of seismic survey equipment currently in use.

Prior attempts to show seismic information with the use of color have involved complex mechanisms and intricate circuitry beyond that usually employed in recording black and white-type echograms. The apparatus according to the present invention provides a multicolor echogram in the format recognized by those familiar with the black and white version and in a simplified manner using easily procured and maintained components. Also, because of the method used in applying this invention, the echograms display a variety of hues in between the primary colors red, green and blue which hues convey much more information to the user of the display without the necessity of further correlation or interpretation

BRIEF DESCRIPTION OF THE DRAWING

The single FIGURE of the drawing is a schematic representation of an apparatus for carrying out the present invention.

DESCRIPTION OF the INVENTION

Referring to the accompanying sketch, a discriminator 20 receives echo signals through receiver 25 when sound generator 22 is operated. Discriminator 20 comprises band pass filters selected to pass three different frequency bands and output three sets of pulses $f_1$ $f_2$ $f_3$, the amplitude of which depend upon the frequency, quality and quantity of sound received in the respective frequency ranges selected. The output pulses of each set energize one of the pulse glow lamps 31, 32, 33 and the resulting light from the lamps is passed through an optical system including pin hole means 61, 62, 63; collimating lenses 42, 42, 43 and mirrors 51, 52, 53. Mirror 51 is a plane mirror and merely serves to change the direction of light from lamp 31 to a desired light path. Mirror 52 is a dichroic mirror which reflects only red and passes green and blue and mirror 53 is a dichroic mirror which reflects only blue light and passes red and green.

Thus, because of the way these mirrors are positioned with respect to the lamps 31, 32, 33, the light reaching plane mirror 54 contains a green component only when lamp 31 is burning, a red component only when lamp 32 is burning and a blue component only when lamp 33 is burning. Plane mirror 54 directs the composite beam to lens carriage 21 which is mounted on endless tape 23 for movement parallel to recording drum 27. Drum 27 carries a polychromatic light sensitive paper 29 and is rotated on bearing 13, 14 by motor 72 through transmission 74.

Endless tape 23 is also driven by motor 72 through transmission 74 thus moving the lens carriage 21 at a controlled rate past the sensitive paper 29. As the carriage 21 is moved past the paper, light is directed by plane mirror 55 through lens 60 to the surface of the paper. An idler spool 18 is provided to complete the path of endless tape 23 and a handle 16 is fastened to tape 23 to facilitate manual positioning of carriage 21 when desired.

The line of dots 80 on paper 29 represent a response to sound increments emitted from transmitter 22, while the dots at 81, 82 and 83 represent primary, secondary and tertiary echoes. So that the dots 80 will be substantially on a straight line and thus reliably represent the relative position of the sound generator with respect to the ocean floor 44, a synchronizer 76 controls the speed of motor 72 in accordance with signals received from sound generator 22.

The chart 29 has delineated thereon only the more prominent signal representations caused by the initial direct report (80) from the sound generator, the primary reflected sound 81, the secondary reflected sound 82 and the tertiary reflected sound 83. What the illustration does not show are the in between reverberations from sea animals subterranean, rock strata and other objects encountered by the sound waves.

Because these reverberations appear generally as a combination of primary colors to give a distinctive hue, the charts present a multicolored "picture" not only of objects between the surface of the water and the subaqueous terrain but also the topography of the terrain as well as various subterranean strata.

What we claim is:

1. In apparatus for surveying and graphically charting the contours of interfaces between water-covered strata, which includes:

means for generating, in the water, substantially nondirectional elastic wave pulses, of short duration, at a uniform rate of repetition from a source substantially at the water surface while moving the source horizontally at constant velocity, each pulse having a broad frequency content including frequencies high enough and low enough, respectively, to produce appreciable reflections from the bottom and the most remote interface of interest;

means for receiving at a position constantly maintained in spaced relationship to said source, those pulse waves that have been reflected from the interfaces;

the improvement comprising:

said receiving means including means amplifying the received pulse waves and passing three selected bandwidths of frequencies thereof; and sensing means including: first means for sensing a first independent spatial variable of said signal, second means for sensing a second independent spatial variable of said signal, and third means for sensing a third independent spatial variable of said signal;

first, second and third light sources, respectively, actuated by each signal variable;

filter means effective to pass only one of three selected primary colors from each of said light sources;

means for recording the summation of said colors;

means for focusing each said color on an identical region of said recording means;

said filter means comprising a first dichroic mirror capable of reflecting only blue light;

a second dischroic mirror capable of reflecting only red light;

said light sources and said mirrors being so arranged that light from said first source is intercepted by said mirrors so as to pass only a green component;

light from said second source is intercepted by said mirrors so as to pass only a red component;

light from said third source is reflected by said mirror reflecting only a blue component;

said recording means including:

revolvable drum means carrying a sheet of color sensitive photographic film, and means for rotating said drum and moving said focusing means along a path parallel to said drum in synchronism with said signal so that a three color multihued photograph is obtained which is representative of the spatial components of the signal.